United States Patent [19]
Sakaue et al.

[11] Patent Number: 5,581,362
[45] Date of Patent: Dec. 3, 1996

[54] VIDEO CAMERA SYSTEM WHICH MULTIPLEXES INTERNAL, EXTERNAL, AND SENSING PARAMETERS ONTO THE VIDEO SIGNAL IN ORDER TO IDENTIFY INDIVIDUAL SEGMENTS

[75] Inventors: Shigeo Sakaue, Moriguchi; Masaaki Nakayama, Hirakata, both of Japan

[73] Assignee: Matsushita Electric Industrial Co., Ltd., Osaka-fu, Japan

[21] Appl. No.: 282,440

[22] Filed: Jul. 29, 1994

[30] Foreign Application Priority Data

Aug. 4, 1993 [JP] Japan ................................. 5-193430

[51] Int. Cl.$^6$ ............................. H04N 5/76; H04N 5/225
[52] U.S. Cl. ..................... 386/95; 358/909.1; 348/207; 386/117
[58] Field of Search .................................. 358/335, 342, 358/147, 403, 906, 909.1; 360/35.1, 33.1, 18, 20; 348/97, 207; H04N 5/76

[56] References Cited

U.S. PATENT DOCUMENTS

| 2,251,608 | 8/1941 | Cook ........................................ 178/7.1 |
| 4,789,895 | 12/1988 | Mustafa et al. ........................ 358/147 |
| 4,984,074 | 1/1991 | Uomori et al. . |
| 5,270,831 | 12/1993 | Parulski et al. ......................... 358/403 |

FOREIGN PATENT DOCUMENTS

| 1-246973 | 10/1989 | Japan . |
| 2-214271 | 8/1990 | Japan . |
| 4-220090 | 8/1992 | Japan . |
| 5-252432 | 9/1993 | Japan . |

Primary Examiner—Tommy P. Chin
Assistant Examiner—David R. Vincent
Attorney, Agent, or Firm—Wenderoth, Lind & Ponack

[57] ABSTRACT

A video camera system has a recording portion and a reproducing portion. The recording portion includes an imaging device for imaging a subject and for generating a video signal, a parameter generator for generating parameters for imaging the subject, a parameter collector for collecting the parameters, a multiplexer for multiplexing the video signal with the parameters and for generating a multiplexed signal, and a recorder for recording the multiplexed signal on a tape. The reproducing portion includes a reproducer for reproducing the multiplex signal from the tape, a separator for separating the multiplexed signal into the video signal and the parameters, a condition detector for detecting a moment when the parameters are set in a predetermined condition, and for producing a condition detected signal, a image reducer for reducing a size of the video signal and for generating a reduced video signal, and a memory for storing the reduced video signal in response to the condition detected signal. In the memory multiple images obtained from different frames are stored for displaying the multiple image.

27 Claims, 11 Drawing Sheets

Fig.4(a)
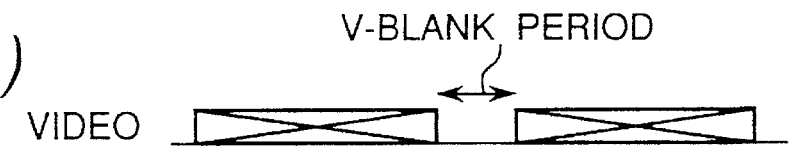
Fig.4(b) FIELD SYNC
Fig.4(c) COLLECTED PARA
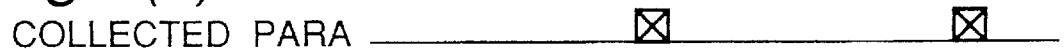
Fig.4(d) MPX SIGNAL
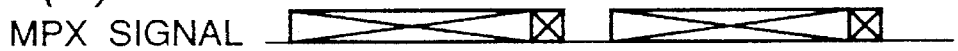
Fig.5
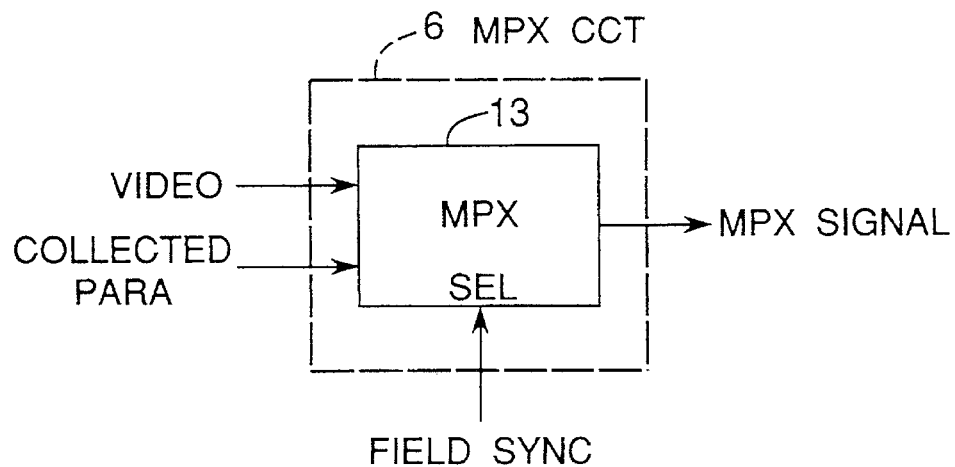

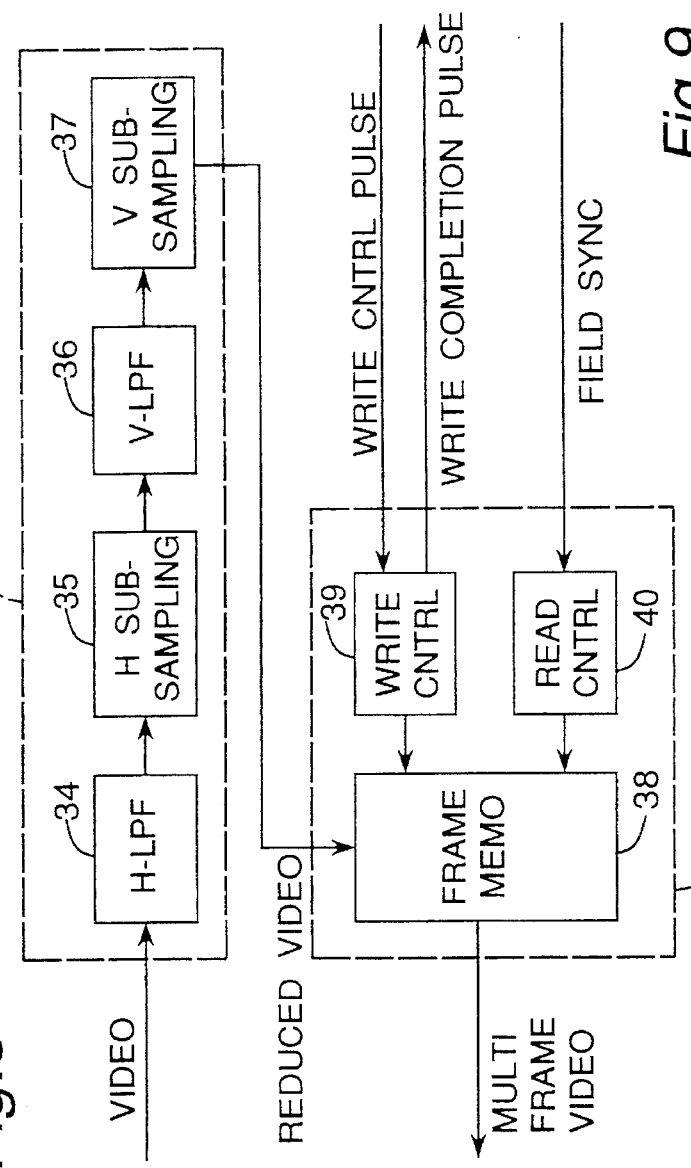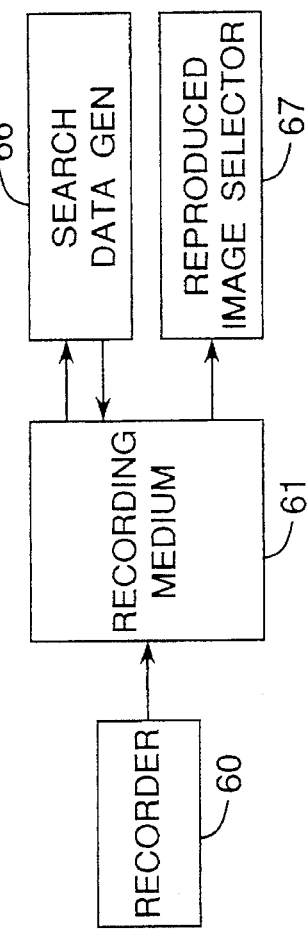

VIDEO CAMERA SYSTEM WHICH MULTIPLEXES INTERNAL, EXTERNAL, AND SENSING PARAMETERS ONTO THE VIDEO SIGNAL IN ORDER TO IDENTIFY INDIVIDUAL SEGMENTS

BACKGROUND OF THE INVENTION

1. Field of the Invention

The present invention relates to a video camera system for recording the video signal of a moving image to tape, disk, semiconductor memory, or other medium, and extracting from the moving image recorded on said medium the image representative of the moving image content.

2. Description of the Prior Art

FIG. 16 is a block diagram of a conventional video camera system described in Japanese Laid-open Patent Publication Number 4-220090, and comprising a video signal input terminal 101, electronic viewfinder 102, recording unit 103, line video output terminal 104, character generator 105, recording start trigger terminal 106, and timer circuit 107. As shown in FIG. 16, the character generator 105 superimposes a character pattern over the video signal, and outputs the composite signal to SW1. The timer circuit 107 sets switch SW1 to pole B1 for a predetermined time starting from the recording start trigger timing, and then switches SW1 to pole A1. As a result of this operation, the signal displayed, recorded, or output by the electronic viewfinder 102, recording unit 103, and line video output terminal 104 is the video signal to which the character pattern is superimposed for the predetermined timing from the recording start trigger timing, and then becomes a normal video signal with no superimposition.

In the video camera system described in Japanese Laid-open Patent Publication Number 2-214271, searching the recorded image is made possible by writing a reduced image of the imaged scene into a video memory each time the recording start trigger button is pressed.

With a conventional magnetic recording and reproducing apparatus as described in Japanese Laid-open Patent Publication Number 1-246973, it is possible to extract just the data signal for searching, editing, and other processes without damaging the video signal by recording a time code or other data signal multiplexed with the vertical blanking period of the video signal.

However, it is difficult to search for and find a frame representative of the content of the motion image from an image recorded by a video camera system thus comprised. For example, to find a frame to which a specific character pattern has been superimposed in an image recorded by the video camera system described in Japanese Laid-open Patent Publication Number 4-220090, it is necessary to first separate the character pattern from the video signal and then compare the separated character pattern with the character pattern to be found, a conceptually simple but technically difficult task to accomplish.

With images recorded using the video camera system in Japanese Laid-open Patent Publication Number 2-214271, it is only possible to search for the image captured at the moment the recording start trigger button was pressed. Because the frame captured at that instant is rarely the frame that is most representative of the image, the precision of searching for the representative frame is low.

In addition, the data signal recorded by the magnetic recording and reproducing apparatus described in Japanese patent laid-open number 1-246973 only indicates the time and frame number, and this information is insufficient for automatically locating the frame that best represents the image.

SUMMARY OF THE INVENTION

Therefore, an object of the present invention is to provide a video camera system capable of automatically locating the frame or field that is typical of the content of the recorded motion image.

To achieve this object, a video camera system according to the present invention comprises: an imaging means for imaging a subject and for generating a video signal; a parameter generator for generating parameters for imaging said subject; a parameter collector for collecting said parameters; a multiplexer for multiplexing said video signal with said parameters and for generating a multiplexed signal; a recording means for recording said multiplexed signal into a recording medium; a reproducing means for reproducing said multiplex signal from said recording medium; a separator for separating said multiplexed signal into said video signal and said parameters; a condition detector for detecting a moment when said parameters are set in a predetermined condition, and for producing a condition detected signal; an image reducer for reducing the size of said video signal and for generating a reduced video signal; and a memory for storing said reduced video signal in response to said condition detected signal, whereby said memory stores one or more of said reduced video signals.

By the above configuration, the video camera system of the present invention can extract plural frames or fields based on the camera operating parameters reproduced with the video signal, and can output a video signal of multiple images consisting of the reduced extracted frame or field images.

The present application is based upon Japanese Patent Application Serial No. 5-193430, which was filed on Aug. 4, 1993, the entire content of which is expressly incorporated by reference herein.

BRIEF DESCRIPTION OF THE DRAWINGS

The present invention will become more fully understood from the detailed description given below and the accompanying diagrams wherein:

FIGS. 4(a), 4(b), 4(c) and 4(d) are timing charts showing the operation of the operating parameter collection circuit and the multiplexing circuit shown in FIG. 2;

FIG. 5 is a block diagram of a multiplexing circuit shown in FIG. 2;

FIG. 8 is a block diagram of a multiple image frame memory and a reducer shown in FIG. 6;

FIG. 9 is a block diagram of a video camera system according to a second embodiment of the present invention;

DESCRIPTION OF PREFERRED EMBODIMENTS

The first embodiment of a video camera system according to the invention is described below with reference to the block diagram shown in FIG. 1.

Figure 1:
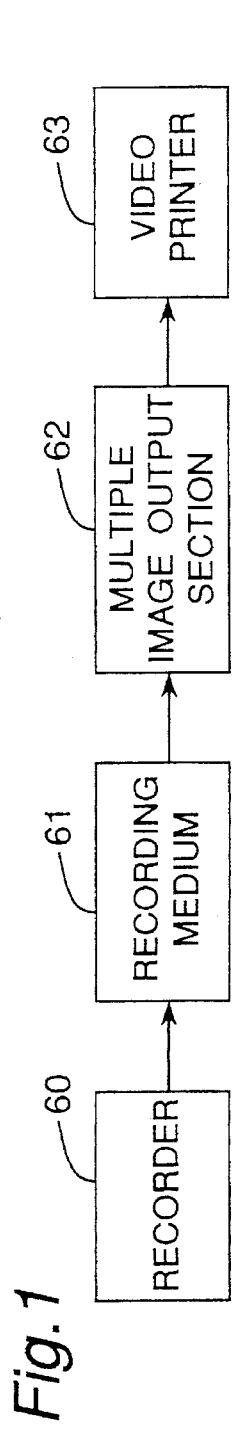
FIG. 1 is a block diagram of a video camera system according to a first embodiment of the present invention.

As shown in FIG. 1, this video camera system comprises a recorder 60, a recording medium 61, a multiple image output section 62, and a video printer 63. In this video camera system, the video signal of the imaged moving image is recorded by the recorder 60 to the recording medium 61. The multiple image output section 62 extracts those frames satisfying specific conditions in the image reproduced from the recording medium 61, and outputs a composite video signal of multiple images formed by combining the reduced images of plural extracted frames. The video printer 63 then prints this multiple image video signal, and a hard-copy printed image of the content of the recording medium 61 is obtained.

Figure 2:
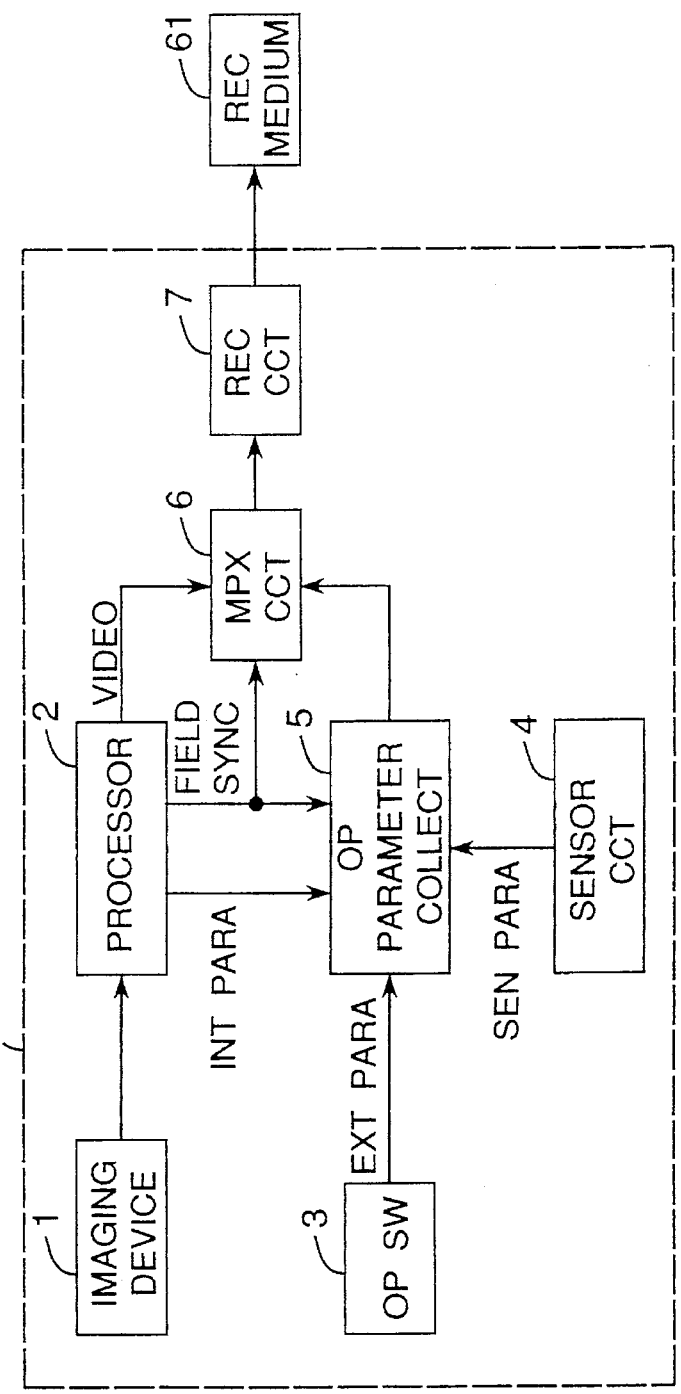
FIG. 2 is a block diagram of the recording unit of the video camera system shown in FIG. 1.

FIG. 2 is a block diagram of the recorder 60 in the video camera system according to the first embodiment. As shown in FIG. 2, the recorder 60 comprises an imaging device 1, signal processor 2, operating switches 3, sensor circuit 4, operating parameter collection circuit 5, multiplexing circuit 6, recording circuit 7, and recording medium 61.

The image of the subject is photoelectrically converted by the imaging device 1, and then processed by the signal processor 2 for white balancing, automatic gain control (AGC), and other operations to generate the video signal supplied to the multiplexing circuit 6. Various parameters of this signal processing operation, such as the set color temperature of the white balance, the gain level of the AGC operation, the speed of hand movement (panning and pitching) detected from the captured image, the on/off status of the electronic zoom, and the magnification ratio of the electronic zoom, are output as the operating parameters during signal processing to the operating parameter collection circuit 5. These parameters from the signal processor 2 are referred to as internal parameters.

Operating parameters produced by the operation of the operating switches 3 by the user, and operating parameters produced from the sensor circuit 4, are also supplied to the operating parameter collection circuit 5.

Operating parameters produced from the operating switches 3 by manual operations include: exposure mode specifying any one of the automatic, gain priority, shutter speed priority, iris priority, and manual modes; shutter speed; white balance mode specifying any one of the automatic, hold, push one stop and preset modes; image stabilize mode specifying its on/off status; the focus control mode; and one cut start signal indicating where one cut of the video signal starts. These parameters from the operating switches 3 are referred to as external parameters.

Operating parameters produced from the sensor circuit 4 includes the lens iris, focal length, and focused subject distance. These parameters from the sensor circuit 4 are referred to as sensor parameters.

Figure 3:
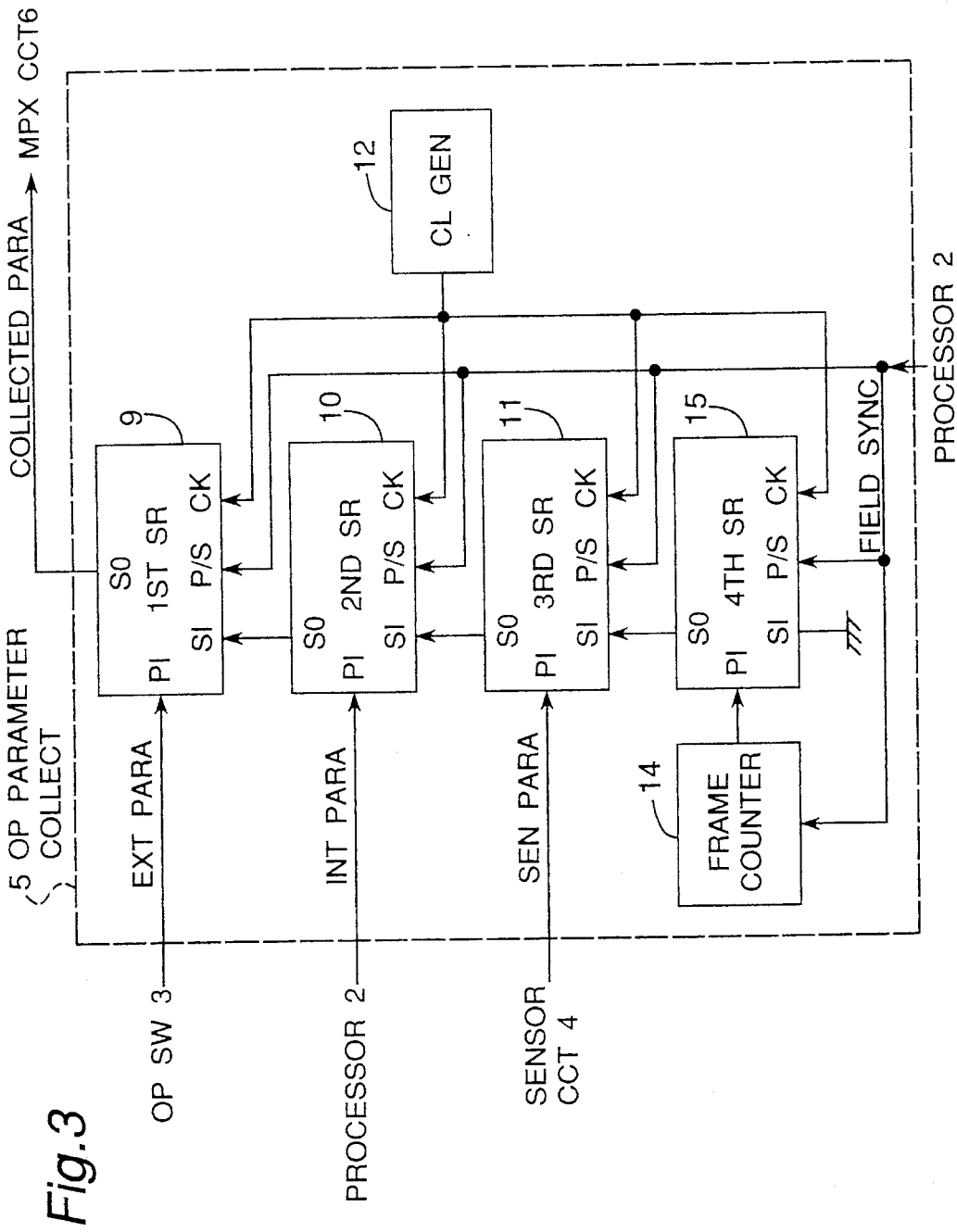
FIG. 3 is a block diagram of the internal configuration of the operating parameter collection circuit shown in FIG. 2.

FIG. 3 is a block diagram of the operating parameter collection circuit 5 in the video camera system of the first embodiment. The operating parameter collection circuit 5 comprises first, second, third, and fourth shift registers 9, 10, 11, and 15, respectively, a serial clock generator 12 and frame counter 14. Each of these four shift registers is a parallel-input serial-output shift register. The first shift register 9 receives the external parameters from the operating switches 3, the second shift register 10 receives the internal parameters from the signal processor 2, the third shift register 11 receives the sensor parameters from the sensor circuit 4, and the fourth shift register 15 receives frame number data from the frame counter 14. These parameters are serially aligned and output from the operating parameter collection circuit 5 as collected parameters. The operation of the operating parameter collection circuit 5 is described in detail below with reference to FIGS. 4(a) to 4(d).

FIGS. 4(a) to 4(d) are timing charts showing the operation of the operating parameter collection circuit 5 and the multiplexing circuit 6 according to the first embodiment. As shown in FIG. 4(b) the field synchronization signal level is 0 during the vertical blanking period of the video signal shown in FIG. 4(a), and is 1 at all other times. The frame counter 14 outputs a frame number that increments one each frame. The first, second, third, and fourth shift registers 9, 10, 11, and 15 are parallel-input, serial-output registers to which the external parameters, the internal parameters, the sensor parameters, and frame number data, respectively, are input when the field synchronization signal, shown in FIG. 4(b), is at a1 level. When the field synchronization signal level is 0, i.e., during the video signal vertical blanking period, the collected parameters, as shown in FIG. 4(c), are serially output while being synchronized to the serial clock output by the serial clock generator 12. The four shift registers are connected in cascade in the order of the first, second, third, and fourth, and the collected parameters are thus output in the following order: external parameters, internal parameters, sensor parameters, and frame number data.

FIG. 5 is a block diagram of the multiplexing circuit 6 comprising a multiplexer 13 according to the first embodiment. When the field synchronization signal level is 1, the video signal is output from the multiplexer 13, and when the field synchronization signal level is 0, the collected parameter block is output. As a result, the multiplexing circuit 6 outputs a signal, as shown in FIG. 4(d), in which the collected parameter block is multiplexed to the vertical blanking period of the video signal. The recording circuit 7 then modulates this multiplexed signal, and records it onto the recording medium 61.

Tables 1a–1e show the content of the external parameters stored to the first shift register 9 of the video camera system of the first embodiment. Table 1a shows the codes for the exposure mode, Table 1b shows the codes for the white balance mode, Table 1c shows the codes for the blur compensation mode, Table 1d shows the codes for the focus control mode, and Table 1e shows the codes for indicating the first frame of one cut scene and the second to the last frames of one cut scene.

TABLE 1a

| Code | Exposure Mode |
|---|---|
| 0000 | Automatic Exposure |
| 0001 | Gain Priority |
| 0010 | Shutter Speed Priority |
| 0011 | Iris Priority |
| 0100 | Manual |
| 1111 | No Information about Exposure Mode |

TABLE 1b

| Code | White Balance Mode |
|---|---|
| 000 | Automatic |
| 001 | Hold |
| 010 | Push One Stop |
| 011 | Preset |
| 111 | No Information about White Balance Mode |

TABLE 1c

| Code | Image Stabilizer Mode |
|---|---|
| 0 | ON |
| 1 | OFF |

TABLE 1d

| Code | Focus Control Mode |
|---|---|
| 0 | Automatic |
| 1 | Manual |

TABLE 1e

| Code | One Cut Start Signal |
|---|---|
| 1 | First Frame of One Cut |
| 0 | Second to the Last Frames of One Cut |

In addition to the above, the shutter speed information is included in the external parameters stored to the first shift register 9, and is expressed as follows:

$$\text{Shutter Speed} = C \times T_H$$

in which C is a 16 bit binary coded integer and $T_H$ is a horizontal scan period (approximately 1/15750 second in the NTSC format).

As shown in Table 1a, the exposure mode is expressed by four bit data identifying whether the subject was taken under automatic, gain priority, shutter speed priority, iris priority, or manual exposure control.

As shown in Table 1b, the white balance mode is expressed by three data bits identifying the white balance mode during picture taking as automatic, hold, push one stop (setting the average white balance of the screen to be achromatic), or preset (manually controlled indoors or outdoors).

As shown in Table 1c, the image stabilizer mode on/off status is identified by one bit and the focus control mode is similarly identified as automatic or manual using one bit as shown in Table 1d.

The internal parameters as produced from the signal processor 2 include the color temperature set for the white balance, the gain level of the AGC operation, the speed of hand movement (panning and pitching) detected from the captured image, the on/off status of the electronic zoom, and the magnification ratio of the electronic zoom. The internal parameters are stored in the second shift register 10 of the video camera system of the first embodiment.

Tables 2a and 2b show the internal parameters of the color temperature set and the on/off status of the electronic zoom.

TABLE 2a

| Code | Color Temperature Set |
|---|---|
| 0000 | Candlelight |
| 0001 | Incandescent Light |
| 0010 | Low Color Temperature Fluorescent Light |
| 0011 | High Color Temperature Fluorescent Light |
| 0100 | Outdoors With Clear Skies |
| 0101 | Outdoors With Cloudy Skies |
| 0110 | Others |
| 1111 | No Color Temperature Information |

TABLE 2b

| Code | Electronic Zoom |
|---|---|
| 0 | ON |
| 1 | OFF |

As shown in Table 2 (a), the color temperature set for the white balance is expressed using four data bits and identifies the light source for which the color temperature was set as being candlelight, incandescent light, low color temperature fluorescent light, high color temperature fluorescent light, outdoors with clear skies, or outdoors with cloudy skies.

As shown in Table 2b, the on/off status of the electronic zoom is expressed by one data bit.

The other internal parameters are the AGC gain level, the amount of hand movement (panning and pitching), and the magnification ratio of the electronic zoom, which are described below.

The AGC gain level is expressed as a multiple of three using an integer 'b' as follows:

$$\text{Gain} = -3 + b \times 3 \text{ (dB)}$$

in which 'b' is a four bit binary integer.

The amount of hand movement (panning and pitching) detected from the captured image is expressed using two integers X and Y representing the amount of hand movement in both horizontal and vertical directions in one field, respectively. These values represent the number of X pixels/field for horizontal movement, and the number of Y lines/field for vertical movement. The integer X can be expressed by a seven bit BCD (binary coded decimal) and the integer Y can be expressed by a six bit BCD.

The magnification ratio of the electronic zoom is expressed by:

$$z \times 2^{-5}$$

in which z is a seven bit data word with two MSBs used for expressing an integer part and five LSBs used for expressing a decimal part.

The sensor parameters as produced from the sensor circuit 4 include the lens iris, focal length, and focused subject distance. The sensor parameters are stored in the third shift register 11 of the video camera system of the first embodiment.

The lens iris, F number, is expressed by integer 'a' as follows:

$$F \text{ number} = 2^{a/8}$$

in which 'a' is an integer expressed by a six bit BCD word.

The focal length is expressed by two integers 'e' and 'f' as follows:

$$\text{Focal Length} = e \times 10^f \text{ [mm]}$$

in which 'e' is an integer expressed by a seven bit BCD word and 'f' is an integer expressed by a one bit BCD word. The focal length given by the above equation is equivalent to that of a 35 mm film camera having the same horizontal angle of view.

The focused subject distance is the distance from the camera to the subject focused upon and is expressed by the two integers 'g' and 'h' as follows:

$$\text{Focused Subject Distance} = g \times 10^h \text{ [cm]}$$

in which 'g' is an integer expressed by a five bit BCD word and 'h' is an integer expressed by a two bit BCD word.

As described above, the recorder 60 of the video camera system of the first embodiment records on the recording medium 61, using the recording circuit 7, the video signal and the collected parameter block multiplexed in the output of the multiplexing circuit 6. The video signal and collected parameter block of this recording signal are located in different time-based areas, and separation of the video signal and the collected parameter block is therefore simple.

Figure 6:
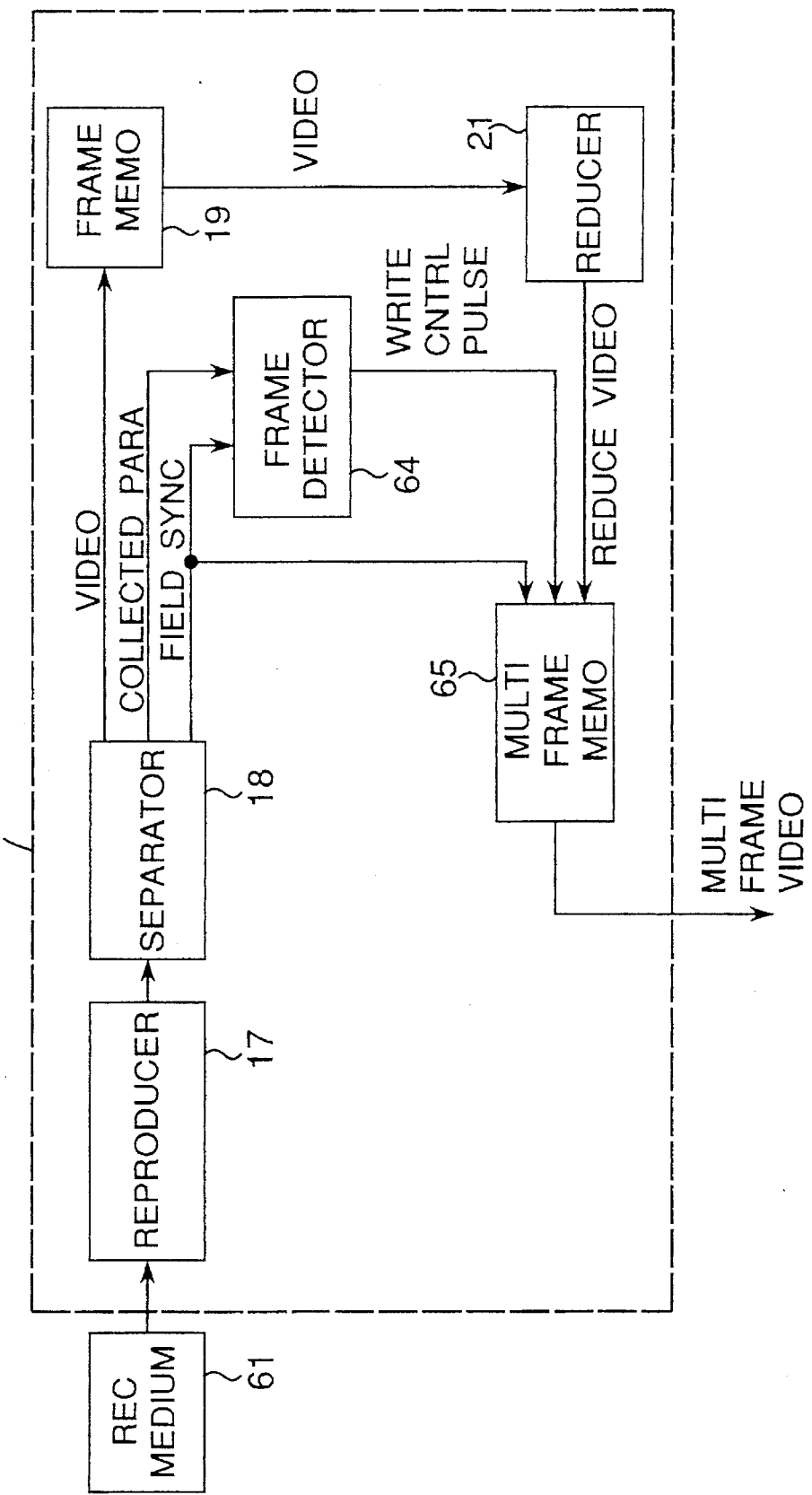
FIG. 6 is a block diagram of a portion of a multiple image generator shown in FIG. 1.

FIG. 6 is a block diagram of the multiple image output section 62 of the video camera system of the first embodiment. As shown in FIG. 6, the multiple image output section 62 comprises a reproducer 17, a separator 18 for separating the video signal and collected parameter block, a frame memory 19 for storing the reproduced video signal, a frame detector 64, reducer 21, and a multiple image frame memory 65.

The demodulated signal reproduced by the reproducer 17 is a time-base multiplexed signal combining the video signal and the collected parameter block identical to the multiplexed signal shown in FIG. 4d.

The separator 18 separates the multiplexed signal into the reproduced video signal and collected parameter block.

The frame memory 19 delays the reproduced video signal one frame.

The frame detector 64 determines during this delay period whether that frame satisfies specific conditions for extraction, and if so outputs a write control pulse.

Figure 7:
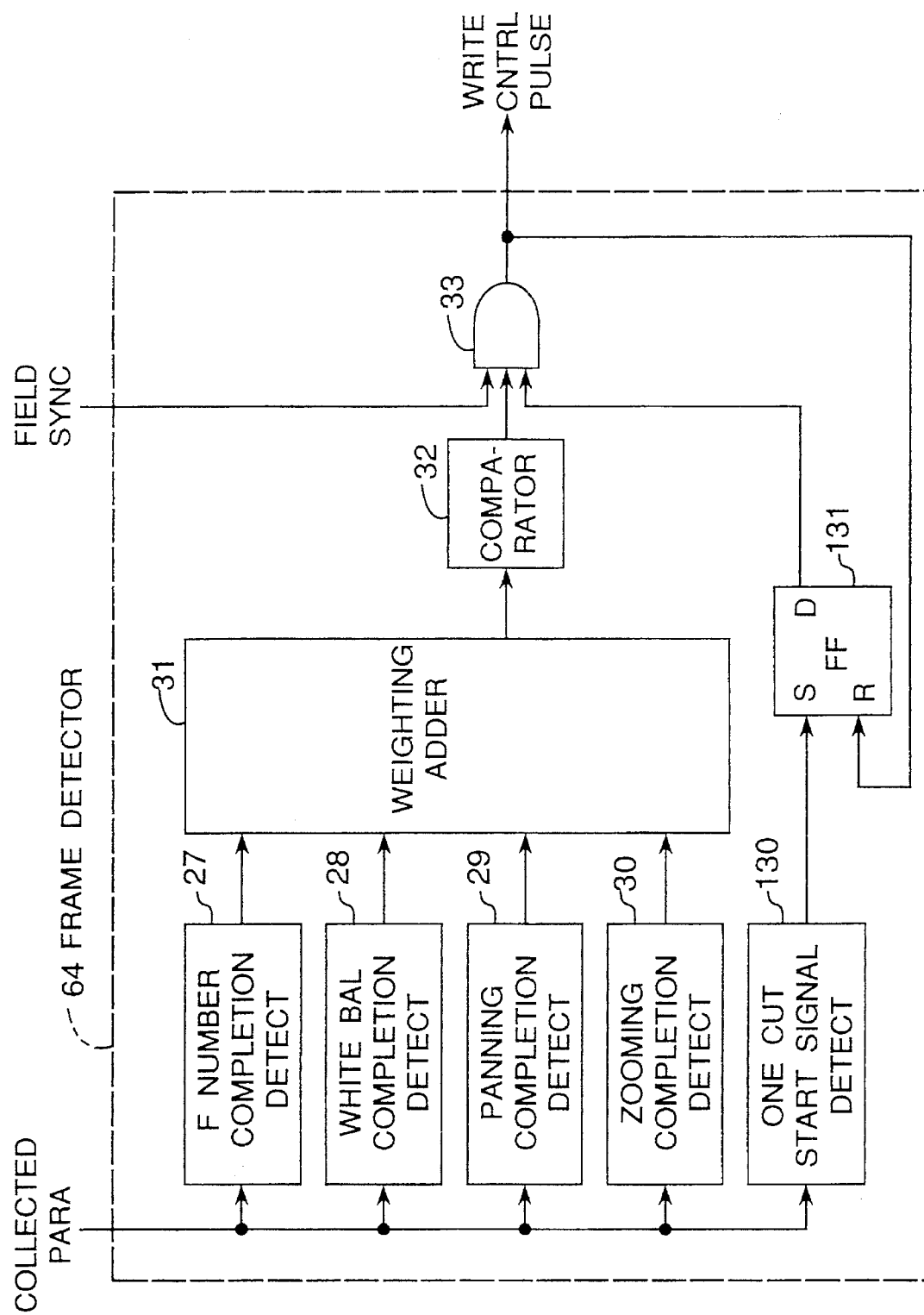
FIG. 7 is a block diagram of a frame detector shown in FIG. 6.

FIG. 7 is a block diagram of the frame detector 64 in accordance with the first embodiment of the present invention. The frame detector 64 comprises an F number completion detector 27 for detecting the end of change in the F number; a white balance completion detector 28 for detecting the end of change in the set white balance color temperature; a panning completion detector 29 for detecting the end of panning; a zooming completion detector 30 for detecting the end of zooming; a one cut start signal detector 130 for detecting the one cut start signal; a flip flop 131 for producing a 1 in response to the leading edge of the first frame of the one cut scene and a 0 in response to the write control pulse; a signal weighting and adder circuit 31 for producing an added data output; a comparator 32 for comparing the added data with a predetermined threshold value; and an AND gate 33 for producing the write control pulse.

The detector circuits 27, 28, 29, and 30 extract the lens iris, set white balance color temperature, amount of hand movement (planning and pitching), and focal length from the collected parameter block, and output a detection pulse value of 0 when the respective detection value increases or decreases for at least a predetermined number of frames and, 1 when the detected value continues unchanged for a predetermined number of frames.

The signal weighting and adder circuit 31 weights each output signal from circuits 27, 28, 29 and 30 and then adds the weighted results. For example, the detection signal output by detector circuits 27 and 28 are weighted by 1, and the detection signals output by detector circuits 29 and 30 are weighted by 2, and then the weighted signals are added.

When the weighted sum output by the signal weighting and adder circuit 31 exceeds a predetermined threshold value, the comparator 32 outputs a 1, but otherwise outputs a 0. As a result, the comparator 32 outputs a 1 if the end of panning or zooming is detected, or if the end of the change in the set white balance color temperature is detected simultaneously with the end of the change in the F number. In other words, the comparator 32 produces a 1 when the video image becomes stable. The output value of the comparator 32 is held while the frame memory 19 outputs the frame of the reproduced video corresponding to the collected parameters used in the frame detector 64. Also, AND gate 33 receives a 1 from flip-flop 131 during a period from the start of one cut to a time when one write control pulse is produced.

The AND gate 33 outputs a write control pulse in response to an output 1 from comparator 32. The AND gate 33 is enabled during a period from the start of one cut to the time of one frame period after a time when one write control pulse is produced. The AND gate 33 outputs a 0 level control pulse at all other times. In this manner, one write control pulse is produced from every one cut, and by the write control pulse, one stable frame is detected for storing the reduced video signal of the detected stable frame in the multiple image frame memory 65.

FIG. 8 is a block diagram of the reducer 21 and multiple image frame memory 65 in accordance with this first embodiment of the present invention. The reducer 21 comprises a horizontal low pass filter 34, a horizontal sub-sampling circuit 35, a vertical low pass filter 36, and a vertical sub-sampling circuit 37. The multiple image frame memory 65 comprises a frame memory 38, a write controller 39 for controlling the writing into the frame memory 38, and a read controller 40 for controlling the reading from the frame memory 38.

The low pass filters 34 and 36 prevent moiré of the high frequency component of the reproduced video signal into the low frequency component by the sampling operation of the sub-sampling circuits 35 and 37. For example, when reducing the image vertically and horizontally to ½, the low pass filters 34 and 36 limit the frequency bandwidth of the video signal to ½ that of the reproduced video signal, and the sub-sampling circuits 35 and 37 sample one of every two pixels horizontally and one of every two lines vertically. The reducer 21 thus supplies a video signal sub-sampled both vertically and horizontally to the frame memory 38 of the multiple image frame memory 65.

The write controller 39 writes the reduced video signal to the frame memory 38 upon receipt of the write control pulse output by the frame detector 64. When the reduced video signal is an image reduced ½ vertically and horizontally, the frame memory 38 is filled when four reduced images are written therein.

The frame memory read controller 40 controls reading the multiple images stored to the frame memory 38 so as to be synchronized to the field synchronization signal.

The multiple image output section 62 of the video camera system of the present invention thus obtains a video signal comprising multiple images of frames satisfying specific conditions from the signal reproduced from the recording medium 61. A summary of the motion images recorded to the recording medium 61 can then be obtained by printing this multiple image frame video signal using the video printer 63 shown in the video camera system in FIG. 1.

It is to be noted that while the multiple image frame video signal output by the multiple image output section 62 is printed as a hard copy by the video printer 63 of this embodiment, it is also possible to simply display the multiple image signal on a television or other display device.

In addition, the operating parameter collection circuit 5 outputs the collected parameters in the order (1) external parameters set by the user operation through the operation switch 3, (2) internal parameters set by the signal processor 2, (3) sensor parameters detected by the sensor circuit 4, and (4) frame number in this embodiment, but the actual output sequence shall not be so limited. The sequence of the collected parameters output by the operating parameter collection circuit 5 can also be mixed in another specific sequence, mixing the sensor parameters, external parameters, and internal parameters, for example, lens iris, exposure mode, AGC gain level, and white balance mode.

The content of the collected parameters output by the operating parameter collection circuit 5 shall also not be limited to that shown in Tables 1a–1e and 2a–2b. For example, the set white balance color temperature shown in Table 2a can be expressed in decamired units ($d=10^5/T$ where d is an integer and T is the color temperature in degrees Kelvin). The amount of hand movement (Table 2c) is also shown as the amount of movement per field in vertical and horizontal directions, but can also be expressed as the amount of movement per frame or per second, or as the direction of hand movement (as an angle to the horizontal plane, for example) and the amount of movement in that direction.

In addition to or in place of any of the detector circuits 27, 28, 29 and 30, one or more of the following circuits may be employed in the frame detector 64. (a) A circuit for detecting that the moving subject is being photographed under a tracking mode. (b) A circuit for detecting that the main subject to be photographed in the image is the largest subject. (c) A circuit for detecting that the main subject is located at the center of the image. (d) A circuit for detecting that the object is facing towards the camera. (e) A circuit for detecting that no moving obstacle comes in between the subject and the camera. (f) A circuit for detecting that the infocus condition is obtained. (g) A circuit for detecting that the contrast of the image is greater than a predetermined reference level. (h) A circuit for detecting that no panning and no pitching is present. (i) A circuit for detecting that no flash is being used.

A detail of various circuits employed in the frame detector 64 is disclosed in U.S. Pat. No. 4,984,074 issued Jan. 8, 1991 to K. Uomori and A. Morimura, the entire content of which is expressly incorporated by reference herein.

The frame detector 64 in the first embodiment also comprises circuits for detecting the end of an F number, set color temperature, panning, and zooming operations, but the frame detector 64 shall not be so limited. It is sufficient if the frame detector 64 comprised a means to detect the representative frames that express the summary of the recorded images from the collected parameters, and may use, for example, a circuit for detecting the change in the exposure mode, or a circuit for detecting the change in the focused subject distance.

The frame detector 64 of the first embodiment also detects the frames when the specific conditions are met, but it is alternatively possible to detect the fields using the same configuration as the frame detector 64. In this case a field memory is used in place of the frame memory 19.

The configuration of a video camera system according to a second embodiment of the present invention is shown in FIG. 9. As shown in FIG. 9, the second embodiment comprises a recorder 60, recording medium 61, search data generator 66, and reproduced image selector 67. In this embodiment, the video signal of the imaged moving image is recorded on the recording medium, such as a tape 61, by the recorder 60. The search data generator 66 extracts the frames satisfying specific conditions from the video signal reproduced from the tape 61, and records at the beginning of the tape 61 the frame number of the detected frame with the multiple image frame video signal of the detected frames. The reproduced image selector 67 contains a fast forward control and reproduces and displays the moving image containing the frame selected by the user. Displaying the moving image containing the frame selected by the user is made possible in this embodiment by using a recorder identical to the recorder 60 of the first embodiment, a search data generator 66, and a reproduced image selector 67.

Figure 10:
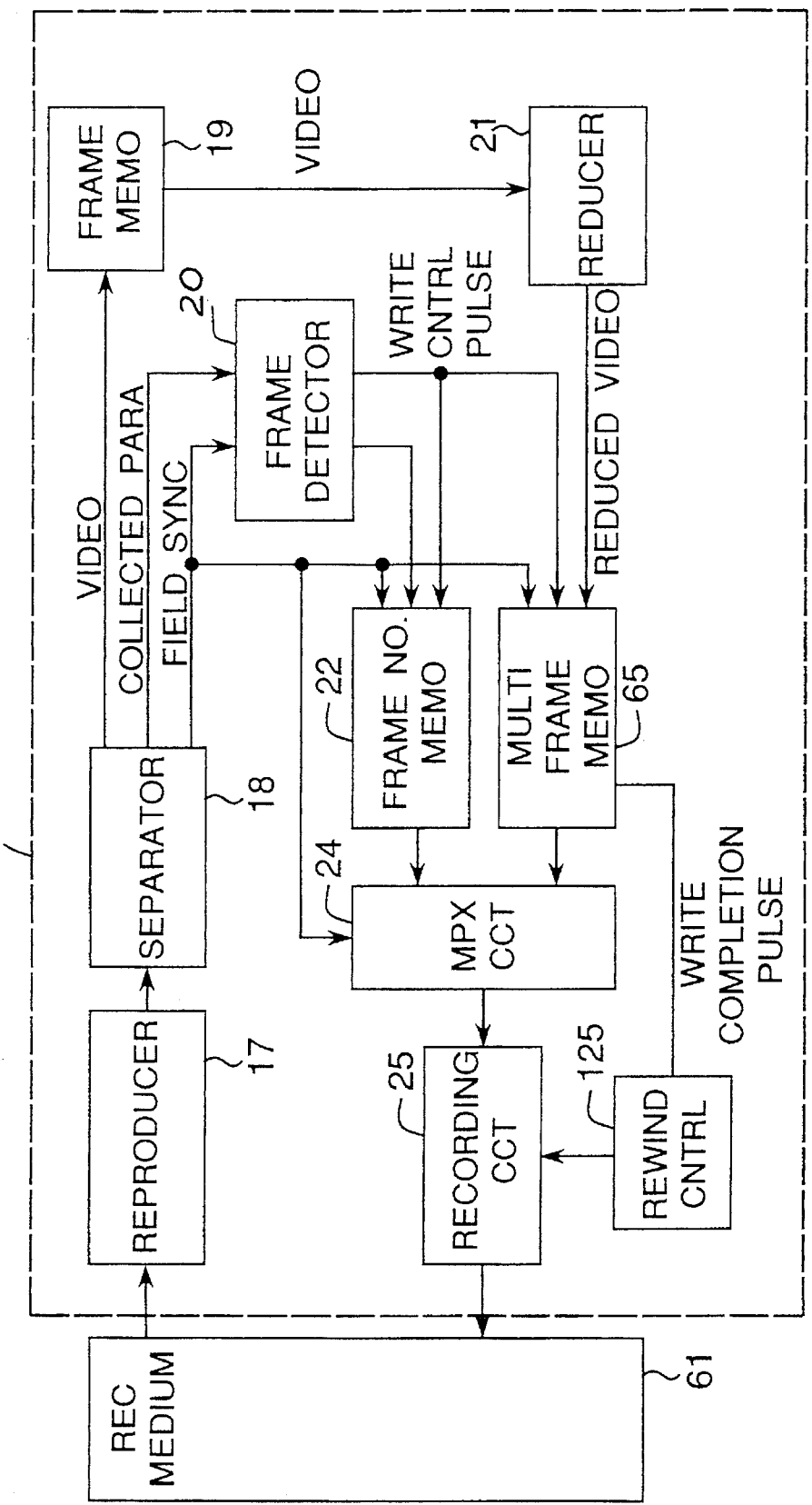
FIG. 10 is a block diagram of a search data generator shown in FIG. 9.

FIG. 10 is a block diagram of the search data generator 66 in accordance with the video camera system of the second embodiment. The search data generator 66 of this embodiment differs from the multiple image output section 62 (FIG. 6) of the first embodiment in that: the frame detector 20 outputs the frame number; the multiple image video signal and the frame number are multiplexed by the multiplexing circuit 24; the tape 61 is rewound to the very beginning by the rewind control 125; and the multiplexed signal is recorded on the beginning portion of the tape 61 by the recording circuit 25.

Figure 11:
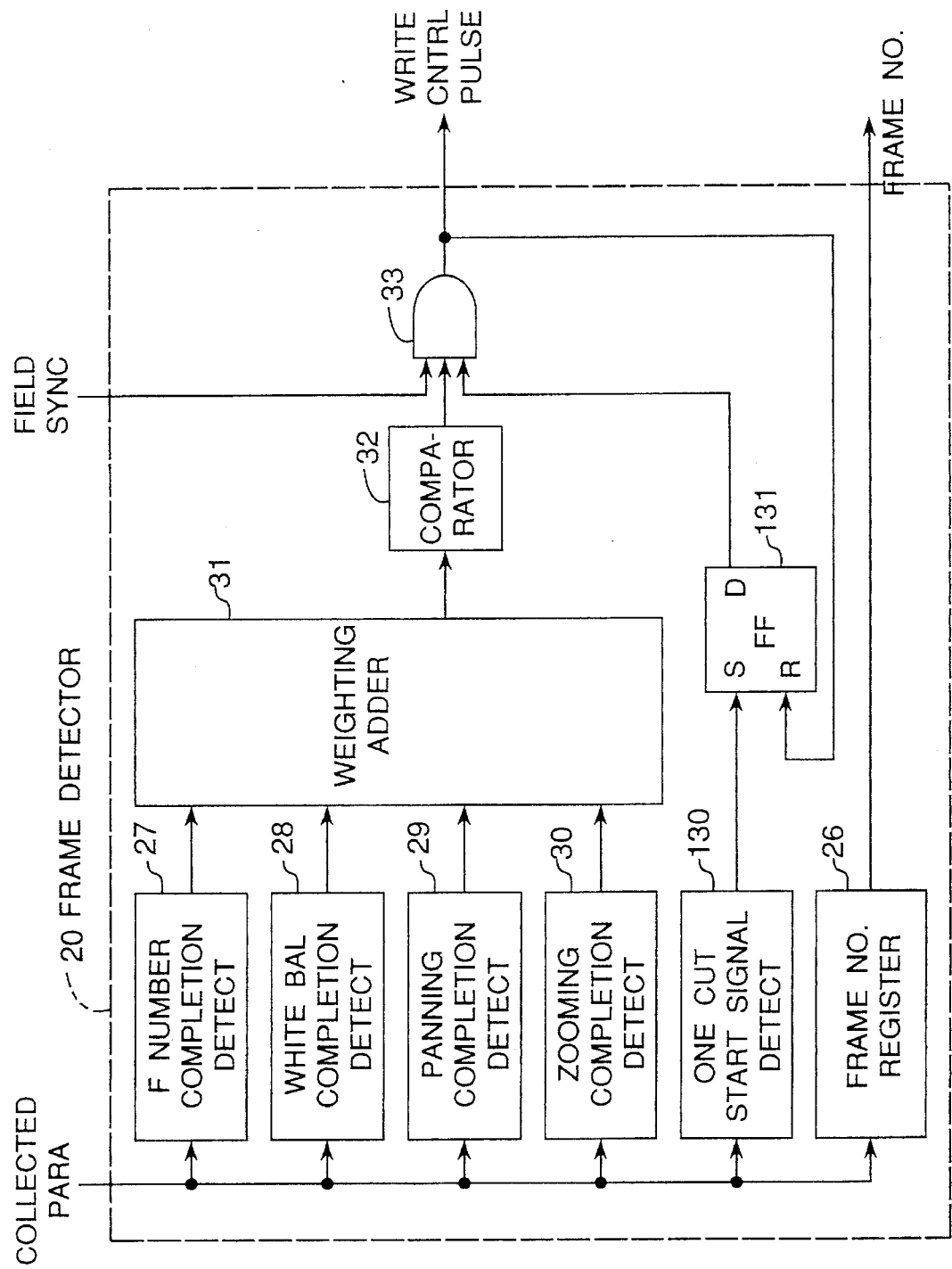
FIG. 11 is a block diagram of a frame detector shown in FIG. 9.

FIG. 11 is a block diagram of the frame detector 20 in accordance with the second embodiment. The frame detector 20 of the second embodiment is the same as the frame detector 64 of the first embodiment with the addition of a frame number register 26 for outputting the frame number simultaneously with the write control pulse.

Figure 12:
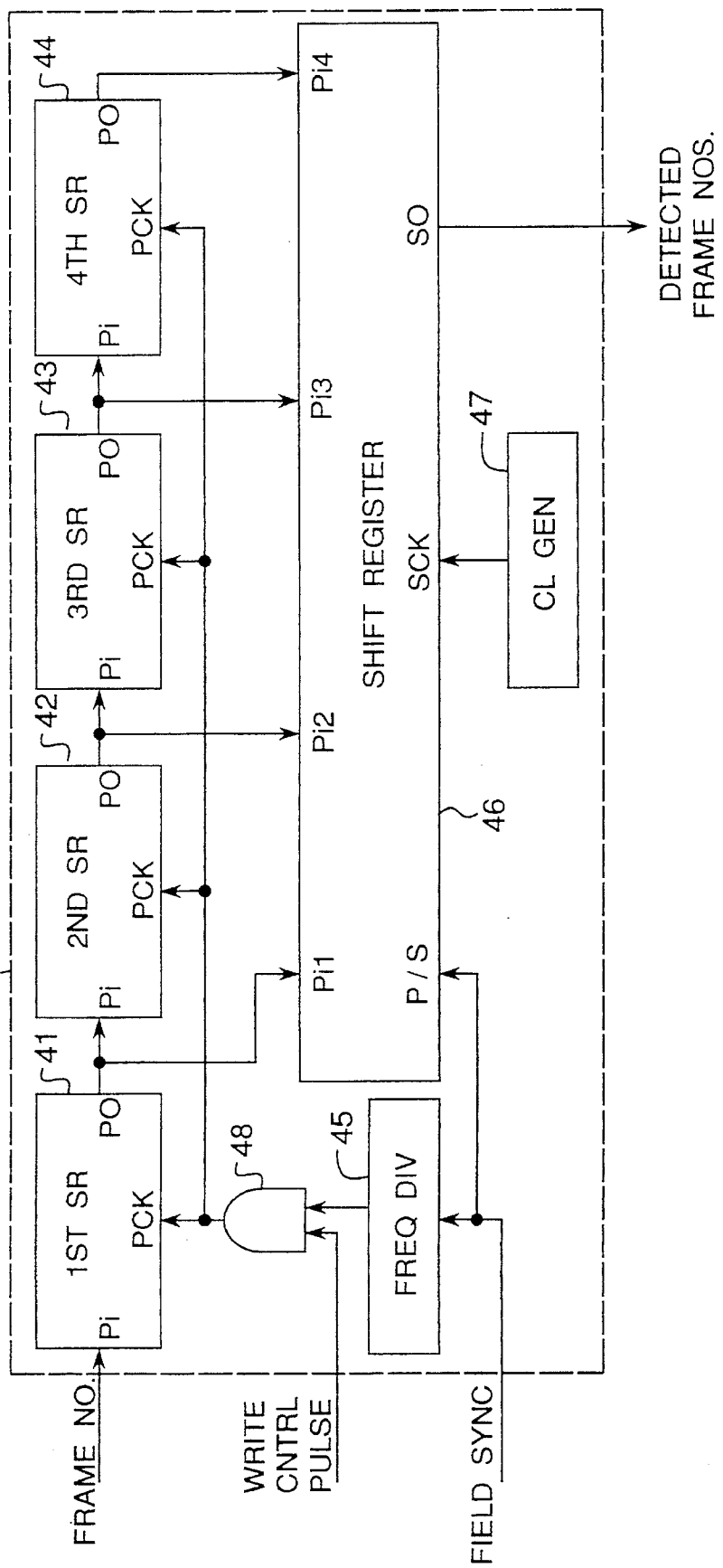
FIG. 12 is a block diagram of a frame number memory shown in FIG. 10.

FIG. 12 is a block diagram of the frame number memory 22 of the second embodiment. The frame number memory 22 comprises first, second, third, and fourth registers 41, 42, 43, and 44, respectively; a ½ frequency divider 45; shift register 46; serial clock generator 47; and AND gate 48. The frame number memory 22 serially converts and outputs the frame number. The operation is described in detail below with reference to FIGS. 13(a)–13(i).

FIGS. 13(a)–13(i) show the operation of the frame number memory 22 and multiplexing circuit 24 in accordance with the second embodiment.

Note that for simplicity, the timing chart shows the operation such that the frame detector 20 extracts the frames of frame numbers 1, 2, 3, and 4. In actual operation, however, the frame detector 20 will not detect successive frames as given in this example, because only one frame is detected from one cut.

The operation of the frame number memory 22 in accordance with the second embodiment is described below with reference to FIGS. 12 and 13(a)–13(i). The ½ frequency divider 45 divides the frequency of the field synchronization signal (FIG. 13(c)) to output the frame cycle pulse. The AND gate 48 outputs the AND result of the write control pulse input from the frame detector 20 (FIG. 13(b)) and the frame cycle pulse output from the ½ frequency divider 45 (FIG. 13(d)) to the first to fourth registers 41, 42, 43, and 44. The frame number is also supplied to the first register 41. The frame number of the detected frame is loaded to the first register 41 synchronized to the pulse output by the AND gate 48. In this manner four detected frame numbers can be stored in four shift registers 41–44 with the earliest detected frame number being stored in the fourth shift register 44. In these shift registers, $P_i$ and $P_o$ indicates parallel input and parallel output, respectively, and $S_o$ indicates a serial output.

Four detected frame numbers as stored in four shift registers are parallelly transferred to shift register 46 in response a 1 of the field synchronization signal. Then, during a 0 of the field synchronization signal, the shift register 46 serially outputs the data of the first–fourth registers 41, 42, 43, and 44 (FIG. 13(e)).

Figure 13:
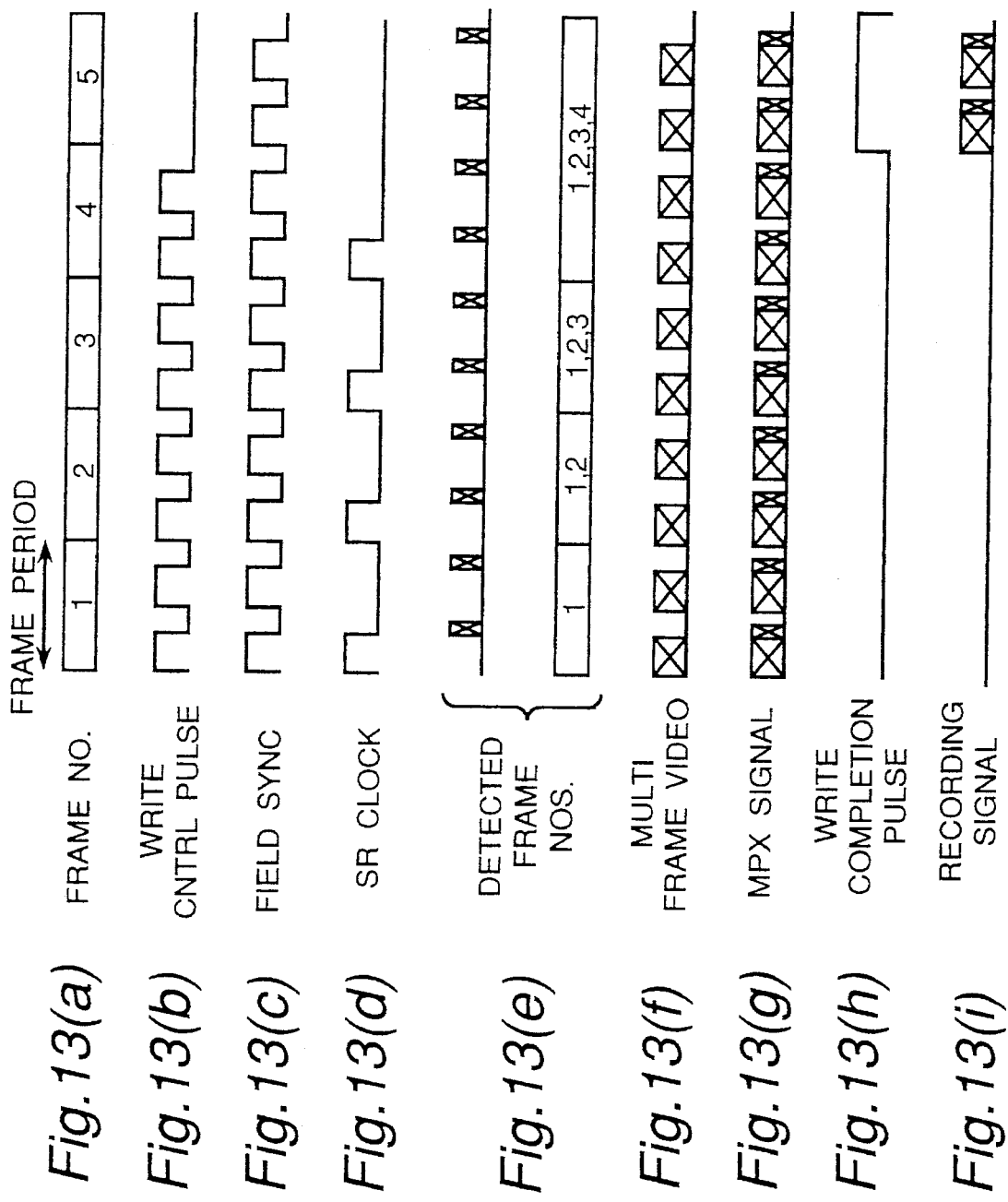
FIGS. 13(a), 13(b), 13(c), 13(d), 13(e), 13(f), 13(g), 13(h) and 13(i) are timing charts showing operation of a frame number memory and a multiplexing circuit shown in FIGS. 10 and 12.
Figure 14:
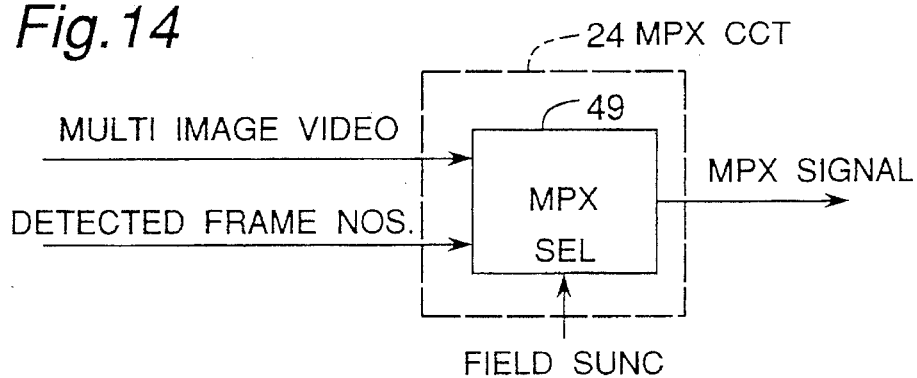
FIG. 14 is a block diagram of a multiplexing circuit shown in FIG. 10.

FIG. 14 shows the multiplexing circuit 24 of the second embodiment which has a multiplexer 49. The multiplexer 49, during a 1 of the field synchronization signal, selects the video signal of the multiple image video signal (FIG. 13(f)), and, during 0 of the field synchronization signal, selects the detected frame numbers (FIG. 13(e)) as produced from shift register 46. The selected signals are multiplexed and the multiplexer 49 produces the multiplexed signal (FIG. 13(g)).

The recording circuit 25 records the multiplexed signal (the recording signal is shown in FIG. 13(i)) on the beginning portion of tape 61 based on the memory write completion pulse (FIG. 13(h)) output by the multiple image frame memory.

As a result, the multiplexed signal of the multiple images and detected frame numbers multiplexed by the multiplexing circuit 24 are recorded on the tape 61 by the recording circuit 25 in the search data generator 66 of the video camera system according to this second embodiment.

Figure 15:
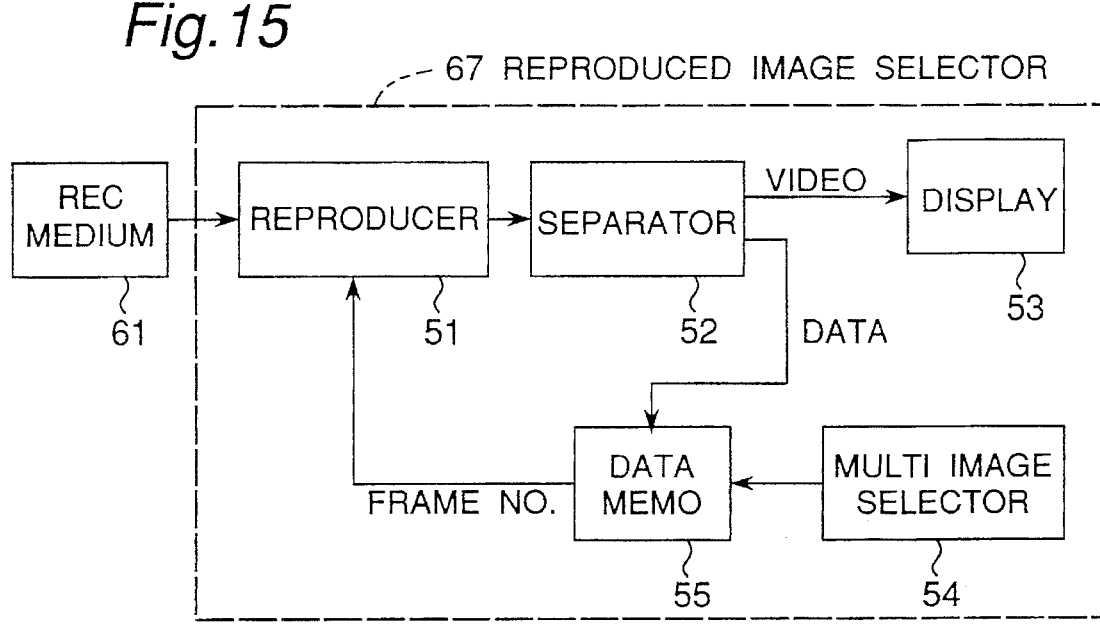
FIG. 15 is a block diagram of a reproduced image selector shown in FIG. 9.
Figure 16:
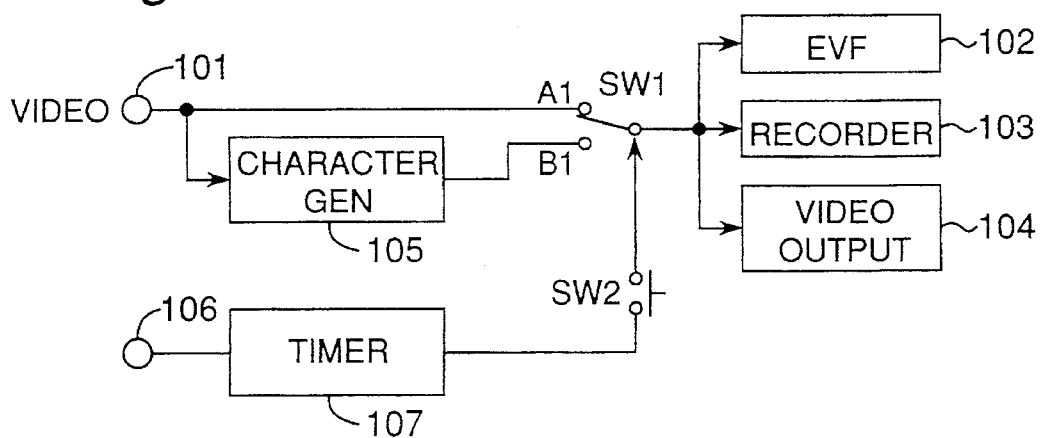
FIG. 16 is a block diagram of a prior art video camera system.

FIG. 15 is a block diagram of the reproduced image selector 67 of the video camera system according to this embodiment. As shown in FIG. 15, the reproduced image selector 67 comprises a reproducing circuit 51, video signal and data separating circuit 52, video display 53, multiple image selector 54, and a data memory 55.

The signals recorded to the tape 61 are: a multiplexed signal of the multiplexed motion image video signal and the camera operating parameters during imaging; and a multiplexed signal of the multiple images forming one screen from plural reduced detected frames and the corresponding frame numbers of the detected frames. The reproducing circuit 51 first reproduces the multiplexed signal of the multiple images and frame numbers. The separating circuit 52 separates the video signals of the multiple images from the frame numbers. The video signals of the multiple images are then displayed by the display 53, and the frame numbers are stored to the data memory 55. The user of the video camera system can then select the frame to be reproduced from among the multiple images displayed by the display 53, and the data memory 55 outputs the number of the frame selected by the user to the reproducing circuit 51. The reproducing circuit 51 then reproduces a specific number of frames including the frame of the frame number input from the data memory 55. The separating circuit 52 separates the reproduced signal into the motion image video signal and collected parameters, and supplies only the video signal to the display 53.

As described above, it is possible to reproduce and display a motion image containing a specific frame selected by the user from among multiple images by means of a video camera system according to the present embodiment.

It is to be noted that the medium to which the recording circuit 25 records the multiplexed signal of the multiple images and extracted frame numbers, and the medium from which the reproducing circuit 17 reproduces the multiplexed signal of video signal and collected parameters, are the same recording medium 61 in this embodiment, but the recording circuit 25 may also record on a different medium than that from which the reproducing circuit 17 reproduces. For example, the reproducing circuit 17 can reproduce from a magnetic tape while the recording circuit 25 records to a semiconductor memory device attached to the magnetic tape. In this case, two reproducing circuits are required, one for the magnetic tape and one for the semiconductor memory, but only one separating circuit 52 is required as in this embodiment, and all other components can also operate as in this embodiment. It therefore remains possible to reproduce and display the moving image containing the frame selected by the user using the same operation as described above.

In addition, the number of the frame selected by the user in this embodiment is supplied to the reproducing circuit, but the selected frame number can also be recorded on the recording medium 61 or on another medium. This makes it possible to sequentially reproduce the moving images containing the selected frames based on the numbers of the plural frames selected by the user. Furthermore, by recording the moving images sequentially reproduced in this way, it is possible to edit the original image signal according to specific user commands.

As described above, it is possible to multiplex and record the camera operating parameters with the video signal of an imaged moving image by means of the video camera system of this invention. Frames or fields representative of the moving image can then be automatically extracted from the reproduced signal, and a screen of multiple images comprising plural reduced images of these representative frames or fields can be produced. As a result, the content of the recorded moving image can be determined at a glance from these multiple images.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A video camera system comprising:

an imaging means for imaging a subject and for generating a video signal;

a parameter generation means for generating parameters for imaging said subject;

a parameter collection means for collecting said parameters;

a first multiplexing means for multiplexing said video signal with said parameters and for generating a first multiplexed signal;

a first recording means for recording said first multiplexed signal on a recording medium;

a reproducing means for reproducing said multiplexed signal from said recording medium;

a separation means for separating said first multiplexed signal into said video signal and said parameters;

a condition detection means for detecting a moment when said parameters are set in a predetermined condition, and for producing a condition detected signal;

an image reducing means for reducing the size of said video signal and for generating a reduced video signal; and a memory means for storing said reduced video signal in response to said condition detected signal, whereby said memory means stores at least one reduced video signal;

wherein said parameter generation means comprises a signal processor means for generating internal parameters, an operation switch means for generating external parameters, and a sensor circuit means for generating sensor parameters.

2. A video camera system as claimed in claim 1, further comprising image forming means for forming an image stored in said memory means.

3. A video camera system as claimed in claim 2, wherein said image forming means is a printer.

4. A video camera system as claimed in claim 2, wherein said image forming means is a display.

5. A video camera system as claimed in claim 1, wherein said first multiplexing means multiplexes said parameters in a vertical blanking period of said video signal.

6. A video camera system as claimed in claim 1, wherein said image reducing means reduces the size of said video signal in one frame.

7. A video camera system as claimed in claim 1, wherein said image reducing means reduces the size of said video signal in one field.

8. A video camera system comprising:

an imaging means for imaging a subject and for generating a video signal;

a parameter generation means for generating parameters for imaging said subject;

a parameter collection means for collecting said parameters;

a first multiplexing means for multiplexing said video signal with said parameters and for generating a first multiplexed signal;

a first recording means for recording said first multiplexed signal on a recording medium;

a reproducing means for reproducing said multiplexed signal from said recording medium;

a separation means for separating said first multiplexed signal into said video signal and said parameters;

a condition detection means for detecting a moment when said parameters are set in a predetermined condition, and for producing a condition detected signal;

an image reducing means for reducing the size of said video signal and for generating a reduced video signal; and a memory means for storing said reduced video signal in response to said condition detected signal, whereby said memory means stores at least one reduced video signal;

wherein said parameters include a lens iris parameter for expressing an F number of said video camera, said lens iris parameter being an integer 'a' in the following equation of the F number:

$$F\ number = 2^{a/8}.$$

9. A video camera system comprising:

an imaging means for imaging a subject and for generating a video signal;

a parameter generation means for generating parameters for imaging said subject;

a parameter collection means for collecting said parameters;

a first multiplexing means for multiplexing said video signal with said parameters and for generating a first multiplexed signal;

a first recording means for recording said first multiplexed signal on a recording medium;

a reproducing means for reproducing said multiplexed signal from said recording medium;

a separation means for separating said first multiplexed signal into said video signal and said parameters;

a condition detection means for detecting a moment when said parameters are set in a predetermined condition, and for producing a condition detected signal;

an image reducing means for reducing the size of said video signal and for generating a reduced video signal; and a memory means for storing said reduced video signal in response to said condition detected signal, whereby said memory means stores at least one reduced video signal;

wherein said parameters include a gain level parameter for expressing a gain G of an automatic gain control in said video camera, said gain level parameter being an integer 'b' in the following equation of the gain G:

$$G = -3 + b \times 3\ (dB).$$

10. A video camera system comprising:

an imaging means for imaging a subject and for generating a video signal;

a parameter generation means for generating parameters for imaging said subject;

a parameter collection means for collecting said parameters;

a first multiplexing means for multiplexing said video signal with said parameters and for generating a first multiplexed signal;

a first recording means for recording said first multiplexed signal on a recording medium;

a reproducing means for reproducing said multiplexed signal from said recording medium;

a separation means for separating said first multiplexed signal into said video signal and said parameters;

a condition detection means for detecting a moment when said parameters are set in a predetermined condition, and for producing a condition detected signal;

an image reducing means for reducing the size of said video signal and for generating a reduced video signal; and a memory means for storing said reduced video signal in response to said condition detected signal, whereby said memory means stores at least one reduced video signal;

wherein said parameters include a shutter speed parameter for expressing a shutter speed Ts of said video camera, said shutter speed parameter being an integer 'c' in the following equation of the shutter speed Ts:

$$Ts = c \times T_H, \text{ (sec)}$$

in which $T_H$ is a horizontal scanning period.

11. A video camera system comprising:
   an imaging means for imaging a subject and for generating a video signal;
   a parameter generation means for generating parameters for imaging said subject;
   a parameter collection means for collecting said parameters;
   a first multiplexing means for multiplexing said video signal with said parameters and for generating a first multiplexed signal;
   a first recording means for recording said first multiplexed signal on a recording medium;
   a reproducing means for reproducing said multiplexed signal from said recording medium;
   a separation means for separating said first multiplexed signal into said video signal and said parameters;
   a condition detection means for detecting a moment when said parameters are set in a predetermined condition, and for producing a condition detected signal;
   an image reducing means for reducing the size of said video signal and for generating a reduced video signal; and
   a memory means for storing said reduced video signal in response to said condition detected signal, whereby said memory means stores at least one reduced video signal;
   wherein said parameters include a color temperature parameter for expressing a set color temperature of a white balance of said video camera, said color temperature parameter being an integer 'd' expressed in decamired units in the following equation:

$$d = 10^5 / T$$

in which T is the color temperature in degrees Kelvin.

12. A video camera system comprising:
   an imaging means for imaging a subject and for generating a video signal;
   a parameter generation means for generating parameters for imaging said subject;
   a parameter collection means for collecting said parameters;
   a first multiplexing means for multiplexing said video signal with said parameters and for generating a first multiplexed signal;
   a first recording means for recording said first multiplexed signal on a recording medium;
   a reproducing means for reproducing said multiplexed signal from said recording medium;
   a separation means for separating said first multiplexed signal into said video signal and said parameters;
   a condition detection means for detecting a moment when said parameters are set in a predetermined condition, and for producing a condition detected signal;
   an image reducing means for reducing the size of said video signal and for generating a reduced video signal; and
   a memory means for storing said reduced video signal in response to said condition detected signal, whereby said memory means stores at least one reduced video signal;
   wherein said parameters include a focal length parameter for expressing a focal length of said video camera, said focal length parameter being converted to a focal length of a 35 mm film camera having the same horizontal field of view as that of said video camera.

13. A video camera system comprising:
   an imaging means for imaging a subject and for generating a video signal;
   a parameter generation means for generating parameters for imaging said subject;
   a parameter collection means for collecting said parameters;
   a first multiplexing means for multiplexing said video signal with said parameters and for generating a first multiplexed signal;
   a first recording means for recording said first multiplexed signal on a recording medium;
   a reproducing means for reproducing said multiplexed signal from said recording medium;
   a separation means for separating said first multiplexed signal into said video signal and said parameters;
   a condition detection means for detecting a moment when said parameters are set in a predetermined condition, and for producing a condition detected signal;
   an image reducing means for reducing the size of said video signal and for generating a reduced video signal; and
   a memory means for storing said reduced video signal in response to said condition detected signal, whereby said memory means stores at least one reduced video signal;
   wherein said parameters include focal length parameters for expressing a focal length of said video camera, said focal length being converted to a focal length of a 35 mm film camera having the same horizontal field of view as that of said video camera, and said focal length parameters being integers 'e' and 'f' in the following equation of the focal length:

$$\text{Focal length} = e \times 10^f \text{ (mm)}.$$

14. A video camera system comprising:
   an imaging means for imaging a subject and for generating a video signal;
   a parameter generation means for generating parameters for imaging said subject;
   a parameter collection means for collecting said parameters;
   a first multiplexing means for multiplexing said video signal with said parameters and for generating a first multiplexed signal;
   a first recording means for recording said first multiplexed signal on a recording medium;
   a reproducing means for reproducing said multiplexed signal from said recording medium;
   a separation means for separating said first multiplexed signal into said video signal and said parameters;
   a condition detection means for detecting a moment when said parameters are set in a predetermined condition, and for producing a condition detected signal;
   an image reducing means for reducing the size of said video signal and for generating a reduced video signal; and a memory means for storing said reduced video signal in response to said condition detected signal, whereby said memory means stores at least one reduced video signal;

wherein said parameters include focal length parameters for expressing a focused distance between said video camera and said focused subject, said focused subject distance parameters being integers 'g' and 'h' in the following equation of the focused subject distance:

Focused subject Distance=$g \times 10^h$ (cm).

15. A video camera system comprising:

an imaging means for imaging a subject and for generating a video signal;

a parameter generation means for generating parameters for imaging said subject;

a parameter collection means for collecting said parameters;

a first multiplexing means for multiplexing said video signal with said parameters and for generating a first multiplexed signal;

a first recording means for recording said first multiplexed signal on a recording medium;

a reproducing means for reproducing said multiplexed signal from said recording medium;

a separation means for separating said first multiplexed signal into said video signal and said parameters;

a condition detection means for detecting a moment when said parameters are set in a predetermined condition, and for producing a condition detected signal;

an image reducing means for reducing the size of said video signal and for generating a reduced video signal; and a memory means for storing said reduced video signal in response to said condition detected signal, whereby said memory means stores at least one reduced video signal;

wherein said parameters include a hand movement compensation parameter for expressing either one of an on and off state of a hand movement compensation means.

16. A video camera system comprising:

an imaging means for imaging a subject and for generating a video signal;

a parameter generation means for generating parameters for imaging said subject;

a parameter collection means for collecting said parameters;

a first multiplexing means for multiplexing said video signal with said parameters and for generating a first multiplexed signal;

a first recording means for recording said first multiplexed signal on a recording medium;

a reproducing means for reproducing said multiplexed signal from said recording medium;

a separation means for separating said first multiplexed signal into said video signal and said parameters;

a condition detection means for detecting a moment when said parameters are set in a predetermined condition, and for producing a condition detected signal;

an image reducing means for reducing the size of said video signal and for generating a reduced video signal; and a memory means for storing said reduced video signal in response to said condition detected signal, whereby said memory means stores at least one reduced video signal;

wherein said parameters include a hand movement compensation amount parameter for expressing an amount of hand movement.

17. A video camera system comprising:

an imaging means for imaging a subject and for generating a video signal;

a parameter generation means for generating parameters for imaging said subject;

a parameter collection means for collecting said parameters;

a first multiplexing means for multiplexing said video signal with said parameters and for generating a first multiplexed signal;

a first recording means for recording said first multiplexed signal on a recording medium;

a reproducing means for reproducing said multiplexed signal from said recording medium;

a separation means for separating said first multiplexed signal into said video signal and said parameters;

a condition detection means for detecting a moment when said parameters are set in a predetermined condition, and for producing a condition detected signal;

an image reducing means for reducing the size of said video signal and for generating a reduced video signal; and a memory means for storing said reduced video signal in response to said condition detected signal, whereby said memory means stores at least one reduced video signal;

wherein said parameters include a hand movement compensation amount parameter for expressing an amount of hand movement in a vertical direction and in a horizontal direction per unit time.

18. A video camera system as claimed in claim 1, wherein said unit time is one frame period.

19. A video camera system as claimed in claim 1, wherein said unit time is one field period.

20. A video camera system as claimed in claim 1, wherein said unit time is one second.

21. A video camera system comprising:

an imaging means for imaging a subject and for generating a video signal;

a parameter generation means for generating parameters for imaging said subject;

a parameter collection means for collecting said parameters;

a first multiplexing means for multiplexing said video signal with said parameters and for generating a first multiplexed signal;

a first recording means for recording said first multiplexed signal on a recording medium:

a reproducing means for reproducing said multiplexed signal from said recording medium;

a separation means for separating said first multiplexed signal into said video signal and said parameters;

a condition detection means for detecting a moment when said parameters are set in a predetermined condition, and for producing a condition detected signal;

an image reducing means for reducing the size of said video signal and for generating a reduced video signal; and a memory means for storing said reduced video signal in response to said condition detected signal, whereby said memory means stores at least one reduced video signal;

wherein said parameters include a hand movement compensation vector parameter for expressing a direction and an amount of hand movement per unit time.

22. A video camera system as claimed in claim 21, wherein said unit time is one frame period.

23. A video camera system as claimed in claim 21, wherein said unit time is one field period.

24. A video camera system as claimed in claim 21, wherein said unit time is one second.

25. A video camera system comprising:

an imaging means for imaging a subject and for generating a video signal;

a parameter generation means for generating parameters for imaging said subject;

a parameter collection means for collecting said parameters;

a first multiplexing means for multiplexing said video signal with said parameters and for generating a first multiplexed signal;

a first recording means for recording said first multiplexed signal on a recording medium;

a reproducing means for reproducing said multiplexed signal from said recording medium;

a separation means for separating said first multiplexed signal into said video signal and said parameters;

a condition detection means for detecting a moment when said parameters are set in a predetermined condition, and for producing a condition detected signal;

an image reducing means for reducing the size of said video signal and for generating a reduced video signal; and a memory means for storing said reduced video signal in response to said condition detected signal, whereby said memory means stores at least one reduced video signal;

wherein said condition detection means produces recording medium position data indicative of a position on said recording medium at the detected moment.

26. A video camera system as claimed in claim 25, further comprising a second multiplexing means for multiplexing said recording medium position data with said reduced video signal and for producing a second multiplexed signal.

27. A video camera system as claimed in claim 26, further comprising a second recording means for recording said second multiplexed signal.

* * * * *